United States Patent [19]

Mabe, Jr.

[11] Patent Number: 5,013,949
[45] Date of Patent: May 7, 1991

[54] MAGNETIC TRANSMISSION
[75] Inventor: William J. Mabe, Jr., Thornton, Colo.
[73] Assignee: Sundstrand Corporation, Rockford, Ill.
[21] Appl. No.: 543,247
[22] Filed: Jun. 25, 1990
[51] Int. Cl.⁵ .............................................. H02K 49/10
[52] U.S. Cl. ...................................... 310/83; 310/103; 74/DIG. 4
[58] Field of Search ................. 310/83, 103, 104, 105, 310/80, 96, 99; 74/DIG. 4, 89.14, 89.16

[56] References Cited
U.S. PATENT DOCUMENTS

| | | | |
|---|---|---|---|
| 3,378,710 | 4/1968 | Martin | 310/104 |
| 3,649,137 | 3/1972 | Laing | 417/420 |
| 3,826,938 | 7/1974 | Filer | 310/104 |
| 4,115,040 | 9/1978 | Knorr | 310/104 |
| 4,725,197 | 2/1988 | Russell et al. | 415/104 |
| 4,808,869 | 2/1989 | Kopp | 310/103 |
| 4,850,821 | 7/1989 | Sakai | 74/DIG. 4 |

Primary Examiner—Steven L. Stephan
Assistant Examiner—Matthew Nguyen
Attorney, Agent, or Firm—William D. Lanyi

[57] ABSTRACT

A magnetic transmission is provided which incorporates a first rotatable member that is generally annular in shape and provided with a plurality of magnetic poles in which the plurality of magnetic poles comprise alternating polarities. A second rotatable member is similarly provided with a plurality of alternating magnetic poles. Both the first and second rotatable members are supported for rotation about individual axes and, preferably, are arranged in concentric and coaxial relation with each other. One of more third rotatable members are also provided with magnetic poles having alternating polarity and supported for rotation about individual axes. These third rotatable members are disposed radially between the first and second rotatable members and are arranged in noncontact magnetic torque transmitting relation with both the first and second rotatable members. Any of the first, second or third rotatable members can be provided with connection to a driving force, such as a motor. When the first rotatable member is the driving member, the magnetic transmission is a speed increasing transmission and, conversely, when the second rotatable member is connected to a driving force and used as a driving member the magnetic transmission is used as a speed reducing transmission. Any of the rotatable members can be fixed and any of the rotatable members can be connected to a device to be driven by the transmission.

12 Claims, 8 Drawing Sheets

MAGNETIC TRANSMISSION

BACKGROUND OF THE INVENTION

1. Field of the Invention

The present invention relates generally to magnetic transmissions and, more specifically, to magnetic transmissions which utilize rotatable planetary members disposed in on contact torque transmitting relation with both a rotatable sun member and a rotatable ring member. Each of the rotatable members is provided with a plurality of magnetic poles which comprise alternating north and south magnetic polarities.

2. Description of the Prior Art

In many different types of applications, it is necessary to isolate the driving member of a transmission from the driven member of a transmission. For example, the driving member may be surrounded by a first fluid and the driven member may be surrounded by a second fluid in an application where the first and second fluid must be isolated from each other. This type of requirement necessitates the physical separation and fluid isolation of the driving and driven members. To solve this type of problem, noncontact magnetic driving members can be used with a nonmagnetizable diaphragm disposed between the driving and driven members to isolate them from each other and any fluids with which they may individually be associated.

U.S. Pat. No. 3,649,137, which issued to Laing on March 14, 1972, describes a centrifugal pump with a magnetic coupling. It incorporates a motor driven centrifugal pump with a magnetic transmission that comprises a permanent magnet pole ring and a soft iron magnetic pole ring, whereby means are provided for reducing the magnetic slots which determine the torque and which flows through the two pole rings.

U.S. Pat. No. 4,115,040, which issued to Knorr on Sept. 19, 1978, describes a permanent magnet pump which comprises a pump impeller and an interior rotor of a permanent magnet driving device that receives drive torque transmitted in synchronism from an exterior rotor. The exterior rotor is positioned, axially in one form and radially in another form, opposite the interior rotor with an air gap defined between them. Thin, plate-like permanent magnets carried by the rotors face each other across the air gap. The pump impeller shaft and the interior rotor are housed and supported in a common space which is sealed from the exterior by a partition of non-magnetizable material extending through the air gap.

U.S. Pat. No. 3,826,938, which issued to Filer on July 30, 1974, shows a magnetic coupling for a motor driven pump. The magnetic drive coupling of this patent can be employed in motor driven pumps and for other purposes, which include coupling members forming part of the magnetic circuit which can be isolated to prevent fluid communication therebetween and in which a plurality of stationary electrically activated flux sources are provided which also form part of the magnetic circuit and in which an improved flux path is provided.

United States Patent 3,378,710 which issued to Martin on April 16, 1968, discloses a magnetic transmission. It describes a magnetic drive that is similar to a planetary gear mechanical drive but with bars instead of rotatable gears in the planet positions. An outer ring magnet, an intermediate planet ring with a plurality of substantially radially magnetically permeable bars and a sun magnet all have a common axis of revolution. One of the elements is power driven and a second element is driven by the magnetic transmission. Either a speed increase or a speed decrease may be achieved with this device.

U.S. Pat. No. 4,850,821, which issued to Sakai on July 25, 1989, discloses a multiple magnet drive pump. Several embodiments of rotatable magnetic components are shown wherein a relatively large ring magnet is associated with a plurality of smaller planet magnets. The embodiments described in this patent dispose the planet magnet both radially outward from and radially inward from the ring magnet.

U.S. Pat. No. 4,725,197, which issued to Russell et al on Feb. 16, 1988, describes a device for imparting rotary motion. One embodiment of this device comprises a down-hole signal transmitter that includes an annular impeller mounted on a cylindrical casing and arranged to be driven by the mud flow passing along a drill string. Each of the impeller and the casing incorporates two sets of magnets with their poles arranged axially relative to one another such that axial movement of the impeller in one direction will tend to be resisted by a force of magnetic repulsion acting between the first set of casing magnets and the second set of impeller magnets and axial movement of the impeller in the opposite direction will tend to be resisted by a force of magnetic repulsion acting between the second set of casing magnets and the first set of impeller magnets. The magnetic coupling between the magnet sets enables driving torque to be transmitted by the impeller to a rotary drive member on which the casing magnets are mounted.

An article, entitled "Magnetic Coupling Delivers Increased Torque" is provided by the National Aeronautics and Space Administration and is identified by number MSC-21171 of the NASA Tech Briefs. This article and additional information regarding research and technology in the general area of magnetic couplings can be found in the Scientific and Technical Aerospace Report (STAR) which is a comprehensive abstracting and indexing journal covering world wide report literature on the science and technology of space and aeronautics. This particular article discusses a magnetically coupler for torque transmission that magnetic couples a rotating drive shaft to a driven shaft across a fluid boundary and allows space in the air gap for placement of other devices, such as fluid conduit, electrical conductor or other component without a great loss of efficiency.

When magnetic transmissions are used in speed reducing or speed increasing applications, the different sizes of driving and driven rotatable members that are required create certain problems which must be addressed. First, steps must be taken to assure that the air gap between the driving magnetic poles and the driven magnetic poles is not excessive to the degree which would reduce the strength of the magnetic coupling between these poles and permit slip to occur between these members which would adversely affect synchronism between the driving and driven members. If the smaller rotatable member is located externally adjacent the outer circumference of the larger rotatable member, the size requirements necessary to house the device must include the sum of the two diameters. If the smaller rotatable member is disposed within the inner circumferential dimension of the larger rotatable member and the two members must be concentric, some means must be taken to minimize the deleterious effect of a large air gap between the driving and driven magnetic poles which may differ significantly in size. The patents described above address these problems in several different ways. The present invention is particularly directed to solving the problem in speed reducing or speed increasing magnetic transmission couplings by reducing the overall required size of the transmission and by decreasing the air gap between the driving and driven magnetic poles so that increased torque can be transmitted without the need to significantly increase the size of the magnetic poles. The present invention is also directed to the provision of a plurality of intermediate rotatable magnet members to transmit torque between a driving member and a driven member. By providing a plurality of intermediate members, the intermediate members share the torque that is transferred between the driving and driven members and, as a result, the overall torque that can be transmitted through the transmission is proportionally increased in relation to the number of intermediate magnets used.

SUMMARY OF THE INVENTION

The present invention addresses the problems described above by providing a first rotatable member which is generally annular in shape and utilized in a function similar to that of a ring gear in a mechanical transmission. The present invention also provides a second rotatable member that operates in a manner similar to that of a sun gear in a mechanical transmission. In addition, the present invention provides at least one third rotatable member that operates in a manner similar to the function of a planet gear in a mechanical transmission. The first, second and third rotatable members, in a preferred embodiment of the present invention, are each provided with a plurality of magnetic poles arranged in a circular pattern and attached to an associated one of said first, second and third rotatable members with alternating north and south magnetic polarity. In a most preferred embodiment of the present invention, a plurality of the third rotatable members is provided and each of the plurality of third rotatable members is disposed radially between the first and second rotatable members.

The preferred embodiment of the present invention comprises a first rotatable member having a first plurality of magnetic Poles and being annular in shape and supported for rotation about a first axis. A second rotatable member has a second plurality of magnetic poles and is supported for rotation about a second axis. A third rotatable member has a third plurality of magnetic poles and is supported for rotation about a third axis. The third rotatable member is disposed radially between the first and second rotatable numbers and is disposed in noncontact magnetic torque transmitting relation with both the first and second rotatable members.

In a preferred embodiment of the present invention, the first and second rotatable members are coaxial and concentric, with common axes of rotation. By disposing the third rotatable members radially between the first and second rotatable members, the present invention reduces the effective air gap between driving and driven magnetic poles. The present invention operates in a manner generally similar to a sun-planet-ring gearset but without actual physical contact between any of the three types of individual members. The first rotatable member can be either the driving or driven member and the second rotatable member can also be either the driving or driven member, depending on the status of the first rotatable member. In an alternate embodiment of the present invention, the third rotatable members can be attached for individual rotation about a rotatable member which, in turn, is rotatable and which can carry the plurality of third rotatable members in a circular path about the axis of the second rotatable member. In this embodiment, either the first, second, or third rotatable members can be driving or driven members. When the first rotatable member is the driving member and the second rotatable member is the driven member, torque is transmitted magnetically from the annular first rotatable member to each of the one or more third rotatable members which are disposed in noncontact magnetic coupling relation with the first rotatable member. In a preferred embodiment of the present invention, the third rotatable members are disposed radially inward from the magnetic poles of the first rotatable member. Also in a preferred embodiment of the present invention, the second rotatable member is disposed radially inward from the third rotatable member and independently supported for rotation on a common axis with the first rotatable member. The rotation of the third rotatable members, caused by the rotation of the driving first rotatable member, transmits torque to the second rotatable member through the noncontact magnetic coupling relation between the third rotatable member and the second rotatable member. In this type of application, the magnetic transmission operates as a speed increaser. If the operation is reversed and the second rotatable member is connected to a driving means, such as a motor, while the first rotatable member is connected to a driven device, such as a fluid handling device, the operation is opposite to that described above and the transmission operates as a speed reducer.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
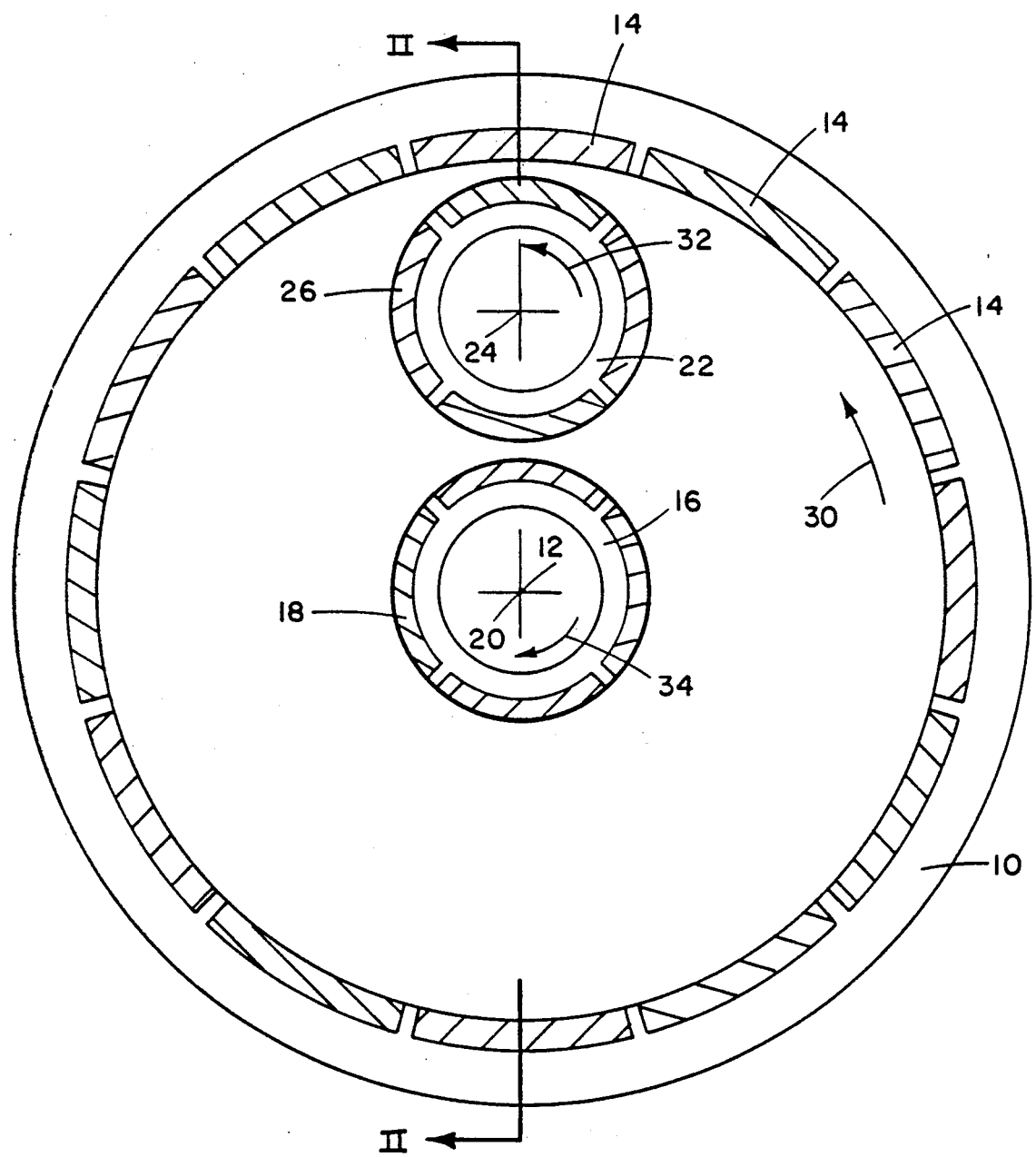
FIG. 1 illustrates a simple embodiment of the present invention with a single third rotatable member.

Throughout the description of the preferred embodiment, like components and elements will be identified by like reference numerals. Furthermore, the patents described above are expressly incorporated by reference within this description of the preferred embodiment.

FIG. 1 shows a schematic illustration of one of the many possible configurations of the present invention chosen for purposes of describing its operation. It should be understood that the particular embodiment shown in FIG. 1 employs twelve magnetic poles in the first rotatable member and four magnetic poles each in the second and third rotatable members. This arrangement provides a three to one speed increase, when the first rotatable member is used as the driving member. This speed increase can also be achieved with six, two and two magnetic poles in the first, second and third rotatable members, respectively. A first rotatable member 10 is generally annular in shape and supported for rotation about a first axis which is shown as point 12 in FIG. 1 as a result of the fact that the view in FIG. 1 is perpendicular to the first axis of rotation. The first rotatable member 10 is provided with a plurality of magnetic poles 14 which, in turn, comprise alternating north and south magnetic polarities.

A second rotatable member 16 is provided with a plurality of magnetic poles 18 which also comprise alternating magnetic polarities. In addition, the second rotatable member 16 is supported for rotation about axis 20, which is also shown as a point in FIG. 1. It should be noted that, in the embodiment illustrated in FIG. 1, point 12 and 20 are coincident. This results from the fact that the first and second rotatable members are both concentric and coaxial in a most preferred embodiment of the present invention.

A third rotatable member 22 is supported for rotation about a third axis. That third axis is shown as a point 24 in FIG. 1 because of the reasons described above in relation to points 12 and 20. The third rotatable member 22 is also provided with a plurality of magnetic poles 26 which comprise alternating magnetic pluralities.

In the embodiment shown in FIG. 1, it can be seen that the first rotatable member 10 is shown as rotating in the direction indicated by arrow 30. This causes the magnetic poles 14 to move in a generally counter-clockwise direction, as indicated by arrow 30, as they pass in noncontact magnetic torque transmitting relation with the magnetic poles 26 of the third rotatable member 22. As the magnetic flux extends across the air gap between the magnetic poles 26 and 14, torque is magnetically transmitted and the third rotatable member rotates in the direction located by arrow 32. Therefore, in the illustration of FIG. 1, it can be seen that both the first and third rotatable members rotate in a generally counterclockwise direction.

As the magnetic poles 26 of the third rotatable member 22 move in a counterclockwise direction, as indicated by arrow 32, they pass in magnetic flux relation with the magnetic poles 18 of the second rotatable member 16. As the magnetic flux extends across the air gap between magnetic poles 18 and 26, torque is magnetically transmitted and the second rotatable member rotates in a generally clockwise direction as indicted by arrow 34. As can be seen, the embodiment of the present invention illustrated in FIG. 1 provides a speed increasing magnetic transmission which results in the rotation of the driven member, or the second rotatable member 16, in a direction opposite to that of the first rotatable member 10 and at a speed that is three times that of the first rotatable member.

By comparing the illustration in FIG. 1 to the various magnetic transmissions provided in the prior art and described in the patents discussed above, it can be seen that the present invention significantly reduces the effective air gaps between the driving and driven magnetic poles. Furthermore, by disposing the second rotatable member 16 within the circumference of the first rotatable member 10, the overall size of this speed increasing transmission is reduced. For a given speed increasing ratio, the use of the third rotatable member 22 permits the second rotatable member 16 to be disposed coaxially and concentrically with the first rotatable member 10 without incurring the significant torque losses that would otherwise occur as a result of enlarged gaps between the magnetic poles of the first rotatable member and the magnetic poles of the second rotatable member that would result from the necessary differences in size between the driving and driven members in a speed changing transmission. In addition, although the arrangement in FIG. 1 only shows one of the third rotatable members, it should be understood that a plurality of the third rotatable members can be disposed radially between the first rotatable member and the second rotatable member. By increasing the number of third rotatable members placed between the first and second rotatable members, the torque transferring capacity of the device is increased proportionally since each of the third rotatable members shares the torque load being transmitted between the first and second rotatable members. This will be described below in greater detail.

Figure 2:
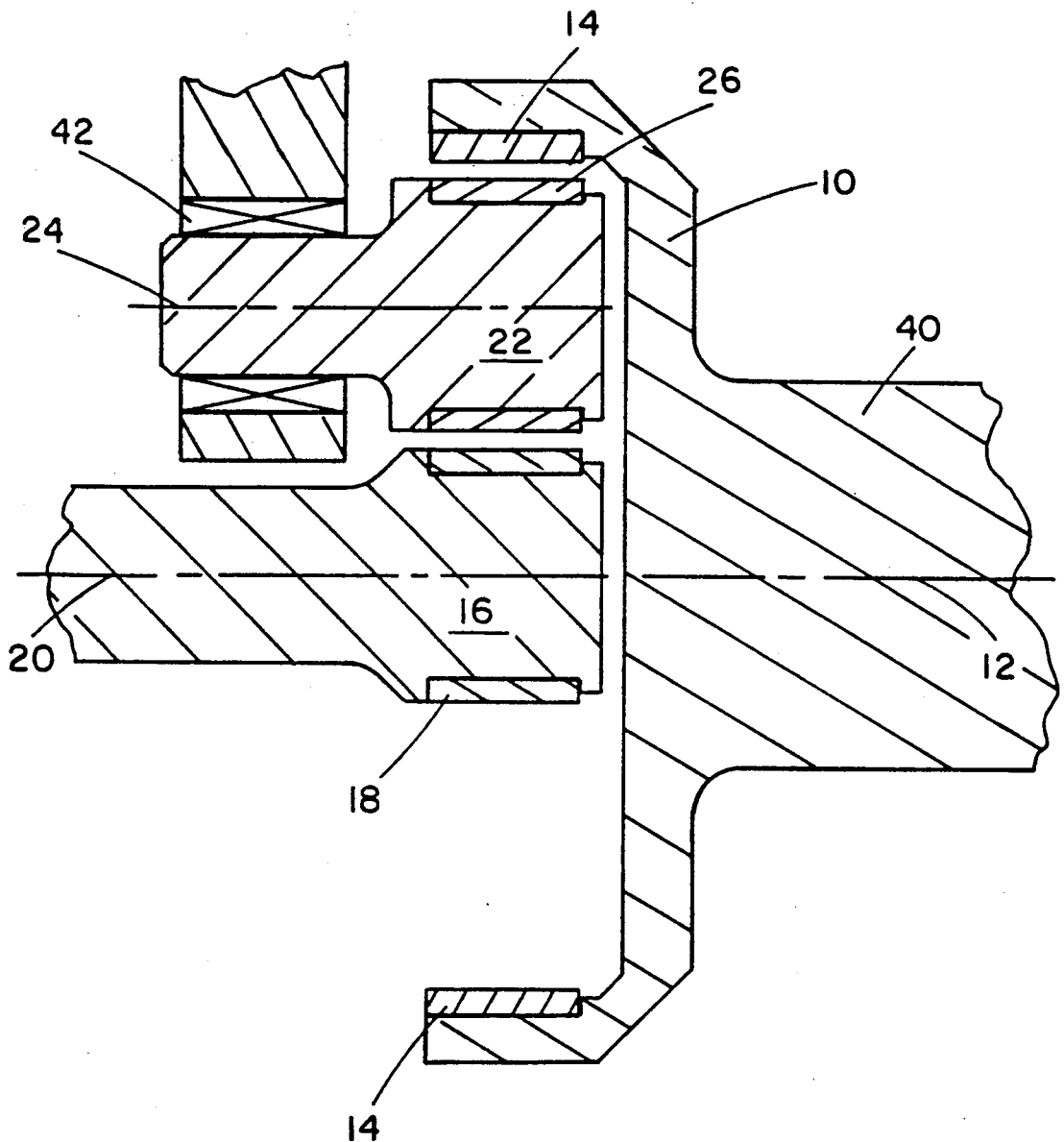
FIG. 2 is a section view of FIG. 1.

FIG. 2 is a sectional view of the embodiment shown in FIG. 1. It should be noted that only one of the third rotatable members 22 is illustrated in FIG. 1 and FIG. 2 for purposes of simplicity and clarity of description. It should also be noted, however, that a preferred embodiment of the present invention would include a plurality of the third rotatable member 22 if the size and the specific application permit.

With reference to FIG. 2, the first rotatable member 10 is shown as a generally annular component with a plurality of magnetic poles 14 attached to it. The first rotatable member 10 is attached to a shaft 40 for connection to a driving device, such as a motor. As can be seen, the first rotatable member 10 and its shaft 40 are supported for rotation about a first axis 12. For purposes of simplicity in illustrating the present invention, no bearings are shown in FIG. 2 supporting the shaft 40 or the first rotatable member 10 for rotation about the first axis 12. FIG. 2 also shows the second rotatable member 16 with its magnetic poles 18 shown in section view. As can also be seen in FIG. 2, the second rotatable member 16 is supported for rotation about a second axis 20 which, in the illustration, is coaxial with the first axis 12. The arrangement shown in FIG. 2 illustrates the fact that, in a preferred embodiment of the present invention, the first rotatable member 10 and the second rotatable member 16 are arranged both coaxially and concentrically.

The third rotatable member 22 is shown with an exemplary illustration of its magnetic poles 26. It is also shown being supported for rotation about a third axis 24. The third rotatable member 22 is shown being supported by an exemplary pair of bearings identified by reference numeral 42 in FIG. 2. It can be seen that the third rotatable member 22 is supported for rotation about its axis 24 but, relative to the first axis of rotation 12 and the second axis of rotation 20, the third axis of rotation 24 is stationary. In other words, the axis 24 of the third rotatable member 22 does not rotate about either the first or second axis of rotation as might be normally expected in a typical planetary gear transmission. However, it should be understood that, in alternative embodiments of the present invention, the third rotatable members 22 can be rotatably attached to an addition carrier for rotation about an axis coincident with the first and second axes.

Figure 3:
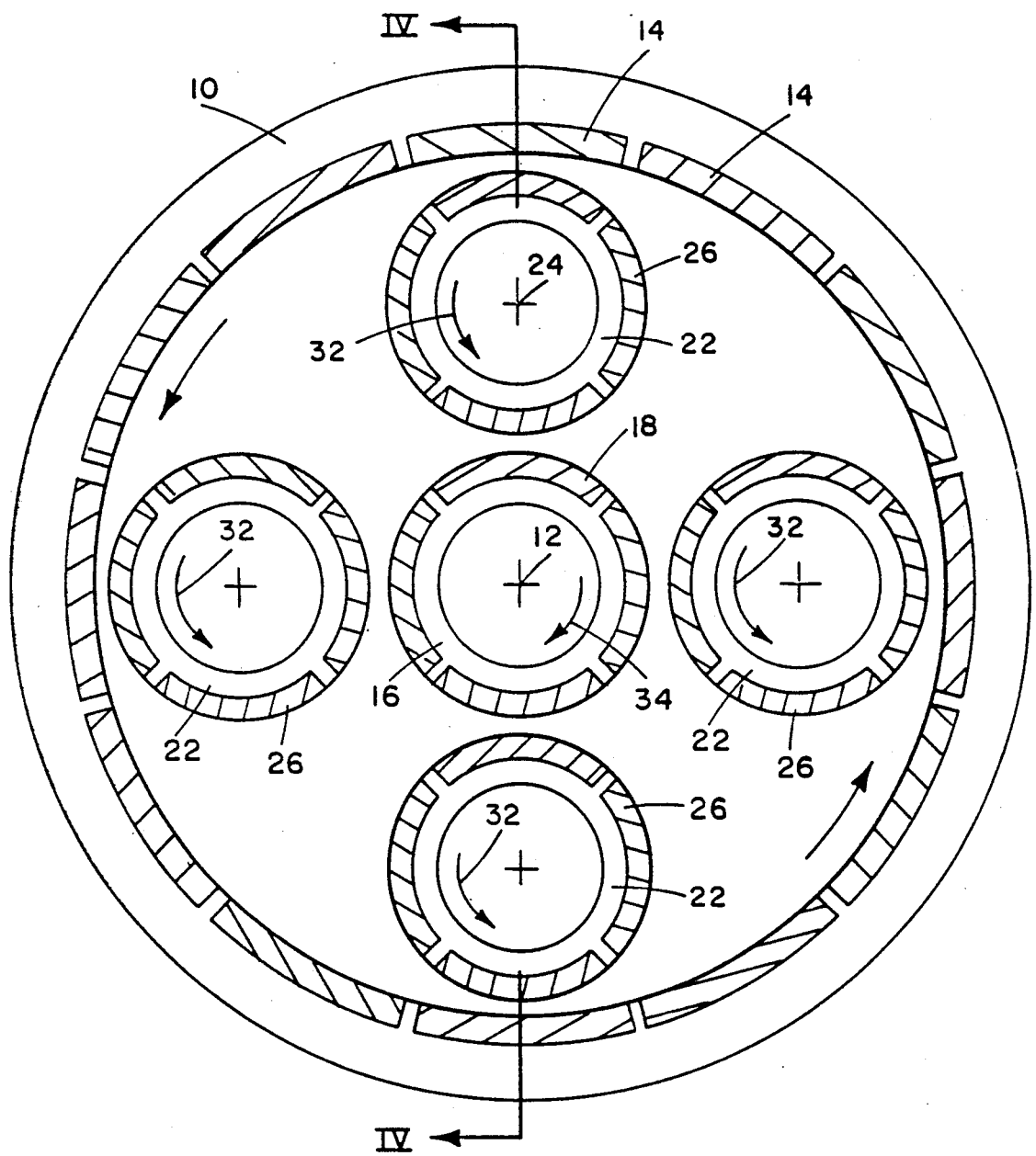
FIG. 3 shows a preferred embodiment of the present invention with a plurality of third rotatable members disposed between the first and second rotatable members.

FIG. 3 shows a preferred embodiment of the present invention in which a single first rotatable member 10 and a single second rotatable member 16 are associated with a plurality with the third rotatable members 22. Each of the third rotatable members 22 comprises a plurality of magnetic poles 26 and is supported for rotation about an axis of rotation that is stationary with respect to the first and second axes of rotation. Each of the third rotatable members 22 is caused to rotate, in a direction indicated by arrows 32, as a result of the coupling of magnetic flux between the magnetic poles 14 of the first rotatable member 10 and the magnetic poles 26 of the third rotatable members 22. Therefore, torque is transmitted from the first rotatable member 10 to the third rotatable member 22 as a result of the noncontact magnetic torque transmitting relation between the first and third rotatable members.

The rotation of the third rotatable member 22, as shown in FIG. 3, causes the second rotatable member 16 to rotate in the generally clockwise direction indicated by arrow 34. Each of the four third rotatable members shown in FIG. 3 is disposed in noncontact magnetic torque transmitting relation with the second rotatable member 34. It should be appreciated that one of the advantages of the present invention is that it permits the torque transferring capacity of a magnetic transmission to be increased through the use of additional third rotatable members. For example, the transmission shown in FIG. 3 is capable of transmitting approximately four times the magnitude of torque that would be possible if only one of the third rotatable members 22 was used instead of four of these members as shown in FIG. 3. Therefore, the present invention permits the torque transferring capacity of the transmission to be increased through the use of additional third rotatable members 22 and, as a result, the torque transmitting capacity is increased proportionately to the number of intermediate rotatable members disposed between the first and second rotatable members.

Figure 4:
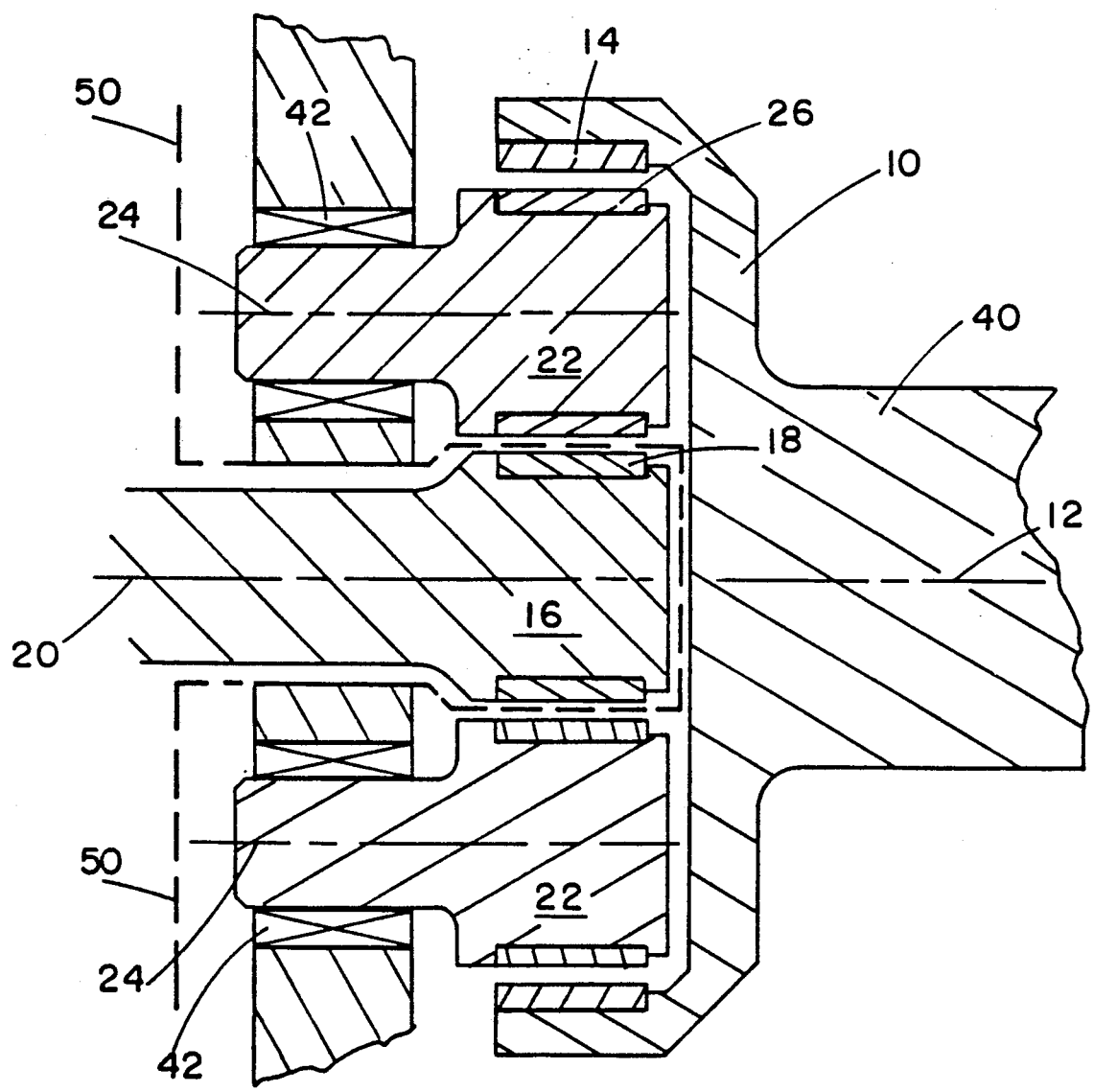
FIG. 4 is a section view, at a specifically chosen angle section, of the device shown in FIG. 3.

FIG. 4 is a section view of the embodiment of the present invention shown in FIG. 3. The first rotatable member 10 is attached to a shaft 40 and is supported for rotation about a first axis 12 by bearings which are not shown in FIG. 4. The second rotatable member 16 is also shown as being supported for rotation about the second axis 20 by bearings which are not shown in FIG. 4. The second rotatable member 16 is provided with a plurality of magnetic poles 18. The third rotatable members 22 which are each shown to be supported for rotation about third axes 24 by bearings 42 are provided with magnetic poles 26. FIG. 4 also shows a magnetically permeable membrane or diaphragm, indicated schematically by dashed line 50, which is used to separate the first rotatable member 10 from the second rotatable member 16. It should be understood that all of the figures are schematic in nature and are not intended to represent specific shapes or positions of the elements. Furthermore, as can be seen, certain components are shown as dashed lines or simplified illustrations for the purpose of simplifying and clarifying the description of the present invention.

If the magnetic transmission shown in FIG. 4 is utilized in a device which must prevent the fluid communication between a first fluid associated with the first rotatable member and a second fluid associated with a second rotatable member, the diaphragm indicated by dashed line 50 would be generally disposed at the location shown in FIG. 4 to isolate the first and second rotatable members and prevent fluid communication between the first and second fluids. The magnetic coupling between magnetic pole 26 and magnetic pole 18, through the magnetically permeable diaphragm indicated by dashed line 50, permits the use of such a fluid isolating membrane in a transmission.

Figure 5:
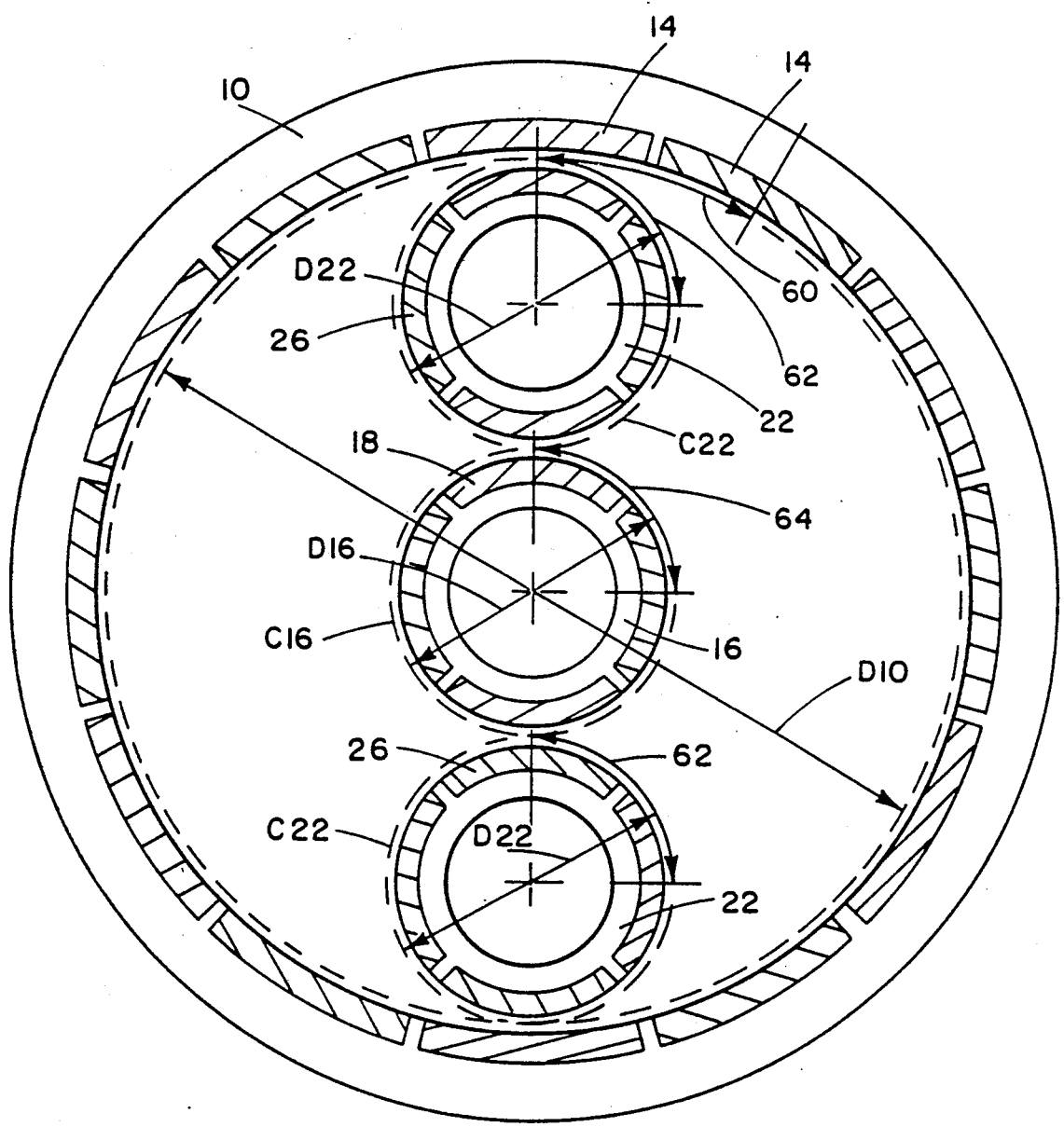
FIG. 5 is a schematic and exemplary illustration of the relevant dimensions pertaining to the operation of the present invention.

FIG. 5 is a schematic illustration of the present invention for the purpose of showing and explaining the relevant dimensions that pertain to the effective operation of the present invention. The first rotatable member 10 is shown with its magnetic poles 14. As described above, it must be realized that the magnetic poles 14 of the first rotatable member 10 comprise a plurality of alternating north and south poles. The third rotatable member 22 is shown disposed generally proximate the first rotatable member 10 with a small air gap between the magnetic poles 14 of the first rotatable member and magnetic pole 26 of the third rotatable member 22. Approximately midway between the circumference on which magnetic poles 14 are disposed and the circumference on which magnetic poles 26 are disposed, there exist effective magnetic diameters which are shown in relation to their effective magnetic circumferences that are illustrated with dashed lines in FIG. 5. In other words, the interrelationship between magnetic poles 14 and magnetic poles 26 is equivalent to that of friction devices or gear devices with effective circumferences C10 and C22, respectively, and effective diameters D10 and D22, respectively. Those two circumferences are tangent at a single point between the magnetic poles 14 and 26. Similarly, the magnetic relationship between the poles 26 of the third rotatable member 22 and poles 18 of the second rotatable member 16 can be represented by the effective circumferences C22 and C16, respectively, and effective diameters D22 and D16, respectively. These circumferences and diameters permit the speed reducing ratios or speed increasing ratios to be determined and, additionally, permit the required number of magnetic poles in each of the rotatable members to be determined along with their angular spacing within their respective rotatable members that is necessary for synchronous operation. In other words, the arcuate length identified by reference numeral 60 in FIG. 5, between the centers of adjacent magnets 14, should be identical in magnitude to the arcuate length between centers of adjacent magnets 26, identified by reference numeral 62 in FIG. 5. Similarly, the arcuate length between the centers of adjacent magnets 18, identified by reference numeral 64 in FIG. 5, should be identical to the length of arcuate distances 60 and 62 if synchronous non-slip transmission of torque is to be achieved.

The calculations necessary to determine the appropriate diameters and arcuate spacings of magnetic poles are well within the scope of knowledge of those skilled in the art of transmissions. However, it should be noted that the speed reducing or speed increasing ratio of the transmission can be determined by comparing the effective diameters of the driving and driven rotatable members. For example, the ratio of D10 to D16 will determine the ratio of speed increase that will result from the use of the transmission shown in FIG. 5.

In more general terms, the ratio R of the total number of poles N1 in the first rotatable member to the total number of poles N2 of the second rotatable member defines the speed increasing or speed reduction ratio when the first or second rotatable member, respectively, is the driving member. This is represented by:

$$R = N1/N2 \qquad (1)$$

In addition, it can be seen that the diameter D1 of the first rotatable member is equal to the diameter D2 of the second rotatable member plus twice the diameter D3 of the third rotatable member. This is shown as:

$$D1 = 2 \times D3 + D2 \qquad (2)$$

For synchronism to exist among all of the rotatable members with no slip occurring between driving and driven members, the arcuate spacing of the magnetic Poles, shown as reference numerals 60, 62 and 64 in FIG. 5, should be equal for all the rotatable members. Therefore, this relationship can be expressed as:

$$C1/N1 = C2/N2 = C3/N3 \qquad (3)$$

This can alternatively be expressed as:

$$D1/N1 = D2/N2 = D3/N3 \qquad (4)$$

Therefore, the ratio R is equal to D1 divided by D2 or, alternatively:

$$D1 = R \times D2 \qquad (5)$$

The relationship shown in equations 2 and 5 result in the equation shown below:

$$D3 = ((R-1)/2) \times D2 \qquad (6)$$

As a result of equations 5 and 6, the first, second and third rotatable members can be specified, in terms of number of poles and relative sizes, if a ratio R and the desired diameter D2 are first selected and the results of equations 5 and 6 are combined with the results of equations 1 and 3 following the selection of a desired number of poles N2 for the second rotatable member. As an example, if a ratio R of three is selected and a diameter D2 of two is selected along with the number of poles N2, all of the relevant dimensions can be determined. For purposes of this example, D2 is chosen to be identical in magnitude with the value of N2. If N2 and D2 are chosen to be equal to two and the ratio R is chosen to be equal to three, the results of the calculations are: D1=6, D3=2, N1=6 and N3=2. This is shown, in Table 1, along with other selected ratios. It should be understood that the results of equations 1-6 and the values shown in Table I are relative and represent a family of acceptable alternatives. For example, the number of poles for the first, second and third rotatable members for a ratio of three to one is shown as a 6/2/2 arrangement in Table I. However, this could also be accomplished with a 12/4/4 arrangement, as shown in FIGS. 1 and 3, an 18/6/6 arrangement or any other configuration which maintains the critical relative dimensions.

TABLE I

| | Number of Poles For Each Rotatable Member | | |
|---|---|---|---|
| Ratio | First | Second | Third |
| 1.25:1 | 20 | 16 | 2 |
| 1.50:1 | 12 | 8 | 2 |
| 2.00:1 | 8 | 4 | 2 |
| 2.25:1 | 36 | 16 | 10 |
| 2.50:1 | 20 | 8 | 6 |
| 3.00:1 | 6 | 2 | 2 |
| 4.00:1 | 16 | 4 | 6 |
| 5.00:1 | 10 | 2 | 4 |
| 6.00:1 | 24 | 4 | 10 |
| 7.00:1 | 14 | 2 | 6 |
| 8.00:1 | 32 | 4 | 14 |
| 9.00:1 | 18 | 2 | 8 |
| 10.00:1 | 40 | 4 | 18 |

Figure 6:
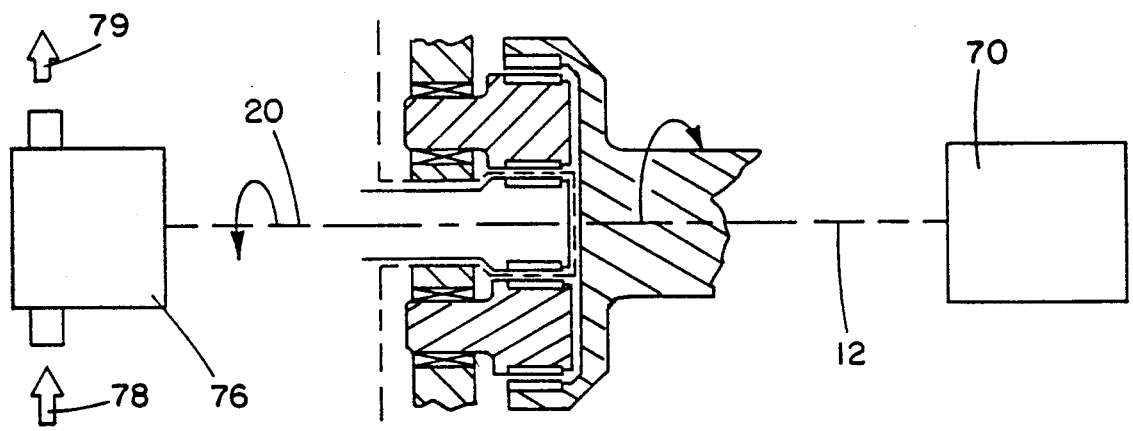
FIG. 6 is a schematic illustration of the device shown in FIG. 4 associated in combination with a driving device and driven device.

FIG. 6 shows an exemplary illustration of the device of FIG. 4 connected in association with a motor and a fluid handling device, such as a pump or a compressor. In the application shown in FIG. 6, the motor 70 is connected to shaft 40 which, in turn, is attached to the first rotatable member 10. In this configuration, the motor would be used to provide torque to drive the first rotatable member 10. Arrow 72 indicates one potential direction of rotation for the driving member. A fluid handling device 76 is connected to the shaft which, in turn, is connected to the second rotatable member 16. As described above, the direction of rotation of the second rotatable member 16 is opposite to that of the first rotatable member 10 in the preferred embodiment of the present invention illustrated in FIGS. 3 and 4 and described above. The fluid handling device 76, which is driven by its connection to the driven second rotatable member 16 can be used to compress or pump fluid as indicated by arrows 78 and 79.

Figure 7:
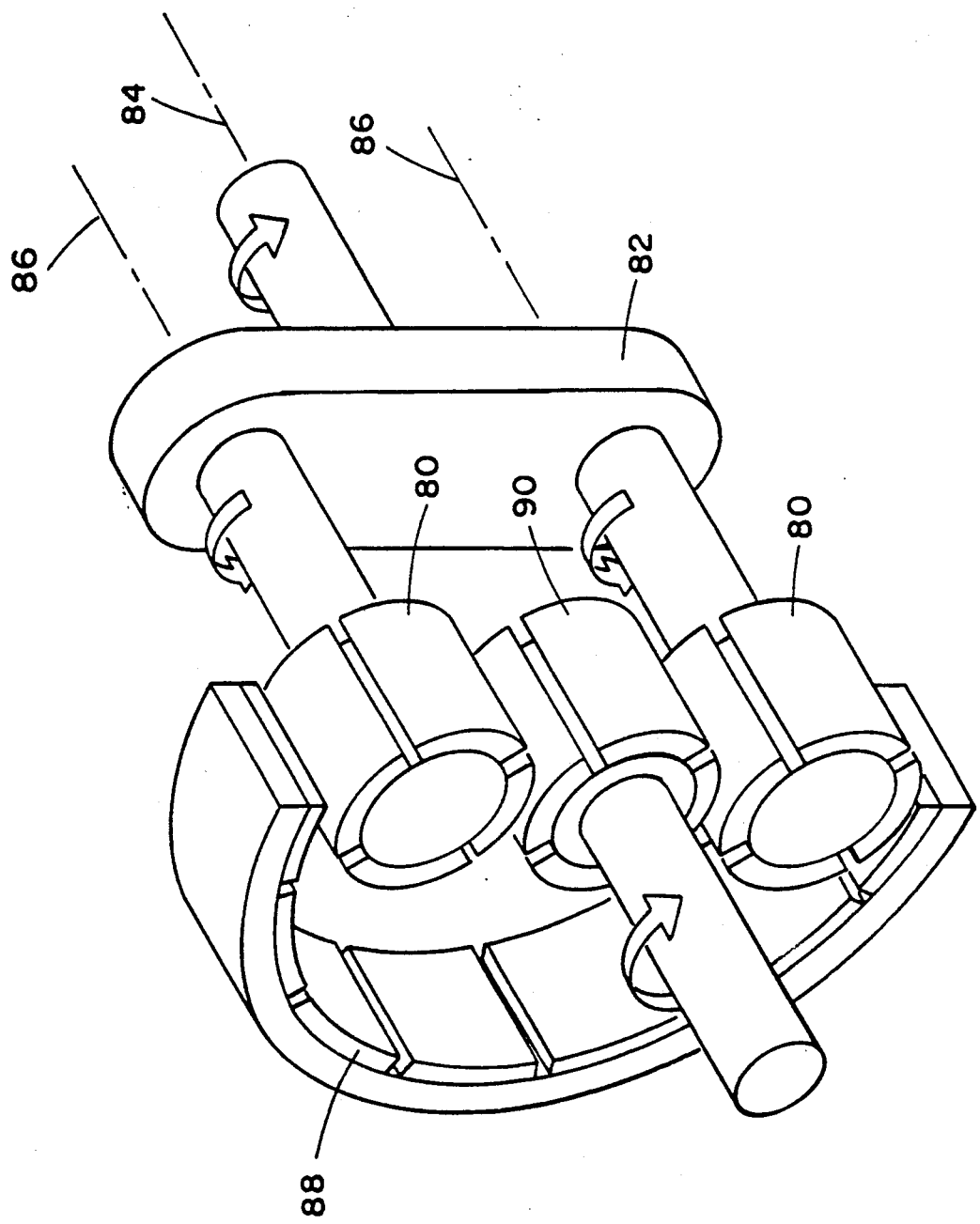
FIG. 7 shows an alternative embodiment of the present invention wherein the planet gears are either driving or driven members of the transmission.

FIG. 7, which represents an alternative embodiment of the present invention, shows an arrangement where the third rotatable members 80 are rotatably mounted on a carrier 82 for rotation about axis 84 as they rotate about their own individual axes of rotation 86. In this embodiment, the first rotatable member 88 can be fixed and the second rotatable member 90 can be the driven member. Alternatively, the second rotatable member 90 can be fixed and the first rotatable member 88 can be the driven member. It should be understood that any one of the first, second or third rotatable members can be fixed with the other two rotatable members being either the driving or driven members.

Figure 8:
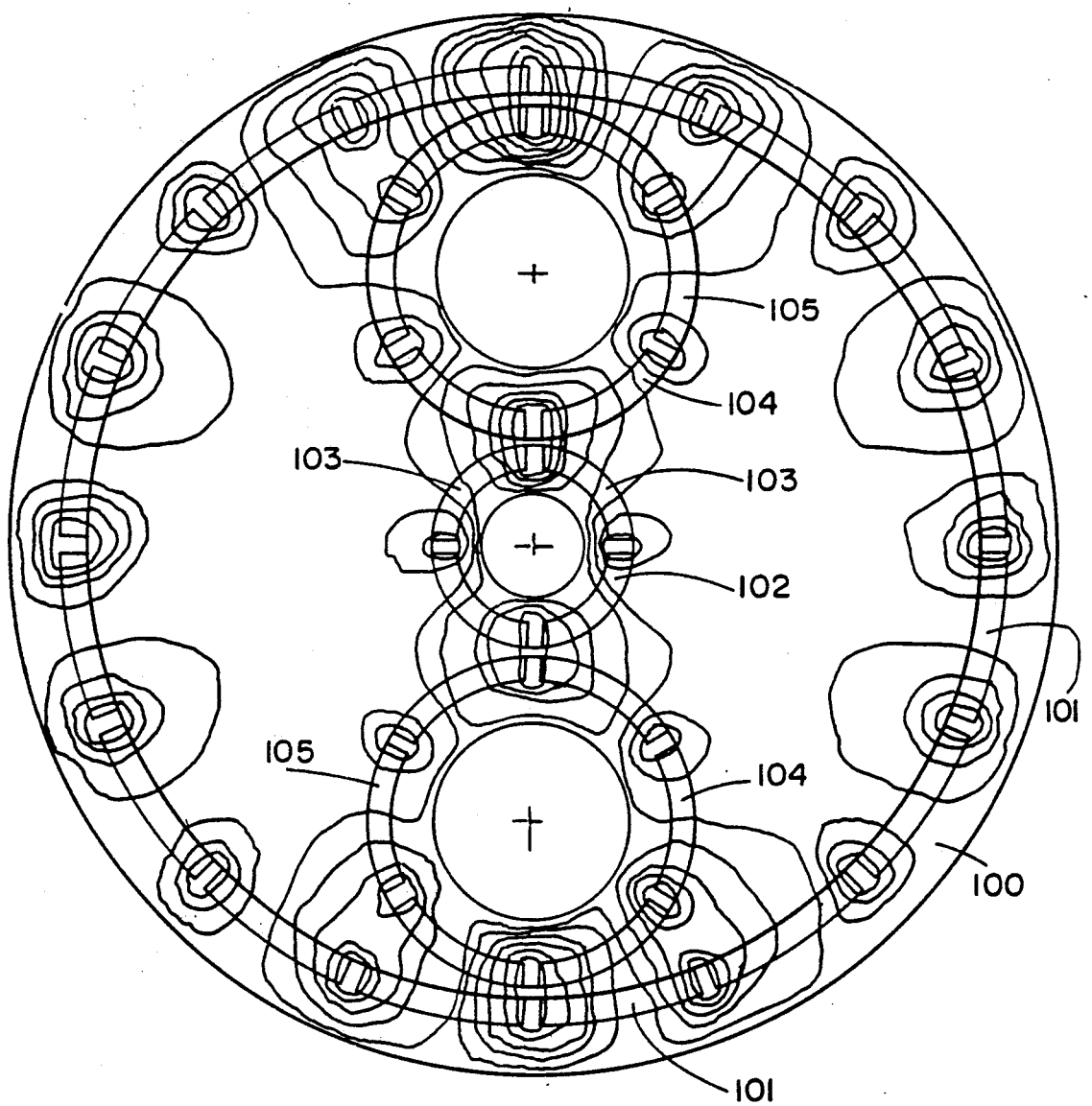
FIG. 8 shows one particular embodiment of the present invention with lines of magnetic flux illustrated to show the magnetic relationship between the rotatable members.

FIG. 8 shows an embodiment of the present invention in which the first rotatable member 100 is provided with sixteen poles 101, the second rotatable member 102 is provided with four poles 103 and the third rotatable members 104 are each provided with six poles 105. This combination of elements results in a ratio value of four to one as can be determined from equations 1-6. It is also shown in Table I. FIG. 8 shows the lines of magnetic flux that exist between the first and third rotatable members and between the second and third rotatable members. In order to avoid confusion with the lines of magnetic flux, no cross section lines are shown in FIG. 8. It should also be understood that, although the device shown in FIG. 8 utilizes two of the third rotatable members, this should not be considered limiting for alternative applications of the present invention. Furthermore, the lines of magnetic flux shown in FIG. 8 are exemplary and intended to be used for their illustrative value and not as a precise magnetic mapping of the system.

It should be understood that the values in Table I represent only a small fraction of the numerous possible ratios that can be achieved in a magnetic transmission made in accordance with the present invention. In addition, it should be understood that any of the rotatable members of the present invention can be used as the driving or driven members and, in addition, any of them can be fixed while the remaining two are left rotatable about their respective axes.

The present invention has been described with significant specificity and illustrated in detail to show a particular preferred embodiment of the present invention. However, it should be clearly understood that other embodiments of the present invention can be provided within the scope of the description above.

What I claim is:

1. A magnetic transmission, comprising:
   a first rotatable member having a first plurality of magnetic poles, said first rotatable member being generally annular and supported for rotation about a first axis;
   a second rotatable member having a second plurality of magnetic poles, said second rotatable member being supported for rotation about a second axis; and
   a third rotatable member having a third plurality of magnetic poles, said third rotatable member being supported for rotation about a third axis, said third rotatable member being disposed between said first and second rotatable members, said third rotatable member being disposed in noncontact magnetic torque transmitting relation with said first rotatable member, said second rotatable member being disposed in noncontact magnetic torque transmitting relation with said third rotatable member.

2. The transmission of claim 1, wherein:
   said first and second rotatable members are arranged in concentric and coaxial relation with each other.

3. The transmission of claim 2, wherein:
   said second rotatable member is disposed radially within said first rotatable member.

4. The transmission of claim 3, wherein:
   said first rotatable member is connected to a motor.

5. The transmission of claim 4, wherein:
   said second rotatable member is connected to a fluid handling device.

6. The transmission of claim 3, further comprising:
   a fourth rotatable member having a fourth plurality of magnetic poles, said fourth rotatable member being supported for rotation about a fourth axis, said fourth rotatable member being disposed between said first and second rotatable members, said fourth rotatable member being disposed in noncontact magnetic torque transmitting relation with said first and second rotatable members.

7. A magnetic transmission, comprising:
   a first rotatable member having a first plurality of magnetic poles of alternating magnetic polarities, said first rotatable member being generally annular and supported for rotation about a first axis;
   a second rotatable member having a second plurality of magnetic poles, said second rotatable member being supported for rotation about a second axis; and
   a plurality of third rotatable members each having a plurality magnetic poles and each being supported for rotation about an individual axis, each of said plurality of third rotatable members being disposed radially between said first and second rotatable members and in noncontact magnetic torque transmitting relation with said first and second rotatable member, said first and second rotatable members being disposed in coaxial and concentric relation with each other.

8. The transmission of claim 7, wherein:
   said first rotatable member is connected to a motor.

9. The transmission of claim 8, wherein:
   said second rotatable member is connected to a fluid handling device.

10. The transmission of claim 7, wherein:
    said first rotatable member is connected to a source of motive power and said second rotatable member is connected to a device to be driven by said transmission.

11. The transmission of claim 7, wherein:
    said third rotatable members are connected to a source of motive power and said second rotatable member is connected to a device to be driven by said transmission.

12. The transmission of claim 7, wherein:
    said second rotatable member is connected to a source of motive power and said first rotatable member is connected to a device to be driven by said transmission.

* * * * *